UNITED STATES PATENT OFFICE.

EDUARD CRAMER, OF BERLIN, GERMANY, ASSIGNOR TO TERRASIT-INDUSTRIE G. M. B. H., OF BERLIN, GERMANY.

MANUFACTURE OF DRY MORTAR OR PLASTER.

1,006,725.     Specification of Letters Patent.     Patented Oct. 24, 1911.

No Drawing.     Application filed September 25, 1908. Serial No. 454,797.

*To all whom it may concern:*

Be it known that I, EDUARD CRAMER, a subject of the German Emperor, residing at 4 Dreysestrasse, Berlin, Germany, have invented new and useful Improvements in the Manufacture of Dry Mortar or Plaster; and I do hereby declare that the following is a full, clear, and exact description of the invention, which will enable others skilled in the art to which it appertains to make and use the same.

This invention relates to improvements in the manufacture of dry mortar or plaster which is durable or capable of being stored.

The manufacture of a dry mortar for plastering is becoming more extensive since experience has shown that it possesses considerable advantages as compared with ordinary mortar which is delivered to the work in a wet condition ready for use. Furthermore, dry mortar or plaster possesses advantages as compared with mortars which are mixed on the ground since the mixing of dry materials in a manufactory is considerably better and cheaper than mixing at the place where the mortar is used. Dry mortar or plaster however, usually possesses the defect of lack of durability. The cause of this lies in the fact that the mortar formers such as cement, gypsum and the like withdraw moisture from the inert substances mixed therewith such as sand, powdered stone and the like and become formed into rigid lumps before they are used for building purposes. Attempts have been made to increase the durability of such mortars or plasters by adding to them quantities of calcium oxid corresponding to the natural amount of moisture possessed by the admixed substances. Experience has, however, shown that these quantities are not sufficient and I have ascertained that durability is obtained by employing double the quantity of calcium oxid or by replacing the calcium oxid by magnesium oxid. I have also obtained good results by the addition of a corresponding quantity of burnt dolomite, which is a mixture of calcium oxid and magnesium oxid. The low atomic value of magnesium causes the quantities by weight of magnesium oxid to be less than that of calcium oxid. The quantities of water-attracting oxids are to be regarded as ballast as they, when stored, extract carbonic acid gas from the atmosphere and thereby become inactive as mortar formers.

The calcium carbonate and magnesium carbonate formed act as a disintegrating medium in the dry mixture. They prevent in the dry condition the intimate union of the mortar formers and the admixed substances.

Having now particularly described and ascertained the nature of my said invention and in what manner the same is to be performed, I declare that what I claim is:—

1. A dry storable mortar or plaster comprising inert material, mortar forming material and in addition thereto magnesium oxid, not forming part of the mortar forming material, said oxid material being present in sufficient quantity to absorb the natural moisture of the admixed substances when mixed, and also to continue to absorb moisture and prevent the deterioration of the mortar forming material during storage and transportation.

2. A dry storable mortar or plaster comprising a mixture of inert material, binding material, and magnesium oxid, said oxid material being present in sufficient quantity to absorb the natural moisture of the admixed substances and prevent deterioration of the mixture during storage or transportation.

EDUARD CRAMER.

Witnesses:
 HENRY HASPER,
 WOLDEMAR HAUPT.

Copies of this patent may be obtained for five cents each, by addressing the "Commissioner of Patents, Washington, D. C."